(12) United States Patent
Yoshida et al.

(10) Patent No.: US 6,613,334 B2
(45) Date of Patent: Sep. 2, 2003

(54) BELT FOR CONTINUOUSLY VARIABLE TRANSMISSION

(75) Inventors: Hideaki Yoshida, Saitama (JP); Hirofumi Akagi, Saitama (JP); Ken Kanokogi, Saitama (JP); Takamichi Shimada, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/925,929

(22) Filed: Aug. 10, 2001

(65) Prior Publication Data
US 2002/0045505 A1 Apr. 18, 2002

(30) Foreign Application Priority Data
Aug. 11, 2000 (JP) ......................... 2000-245018

(51) Int. Cl.⁷ .............. F16G 1/22; F16G 5/16
(52) U.S. Cl. .................. 424/242; 474/201
(58) Field of Search .................. 474/242, 201, 474/244, 245, 240

(56) References Cited
U.S. PATENT DOCUMENTS
6,342,020 B1 * 1/2002 Aoyama .............. 474/242

FOREIGN PATENT DOCUMENTS

| EP | 0 626 524 A1 | 11/1994 |
|----|---|---|
| EP | 0 976 949 A1 | 2/2000 |
| EP | 1 018 608 A1 | 7/2000 |
| JP | 57-65444 A * | 4/1982 |
| JP | 06-193687 A * | 7/1994 |
| JP | 7-12177 | 1/1995 |
| JP | 2000-199545 | 7/2000 |

OTHER PUBLICATIONS

Patent Abstracts of Japan, vol. 16, No. 302, (M–1275), Jul. 3, 1992 and JP 04 083941, Mar. 17, 1992.

* cited by examiner

Primary Examiner—Marcus Charles
(74) Attorney, Agent, or Firm—Arent Fox Kintner Plotkin & Kahn, PLLC

(57) ABSTRACT

A belt for continuously variable transmission, wherein the relationship between the thickness of the metal ring assembly and the groove width of the ring slot is established so that a limit rolling angle α defined as a rolling angle of the metal elements provided when a radially outer peripheral surface of the metal ring assembly contacts a radially outer edge of the ring slot in the metal element is in a range of $0.7° < \alpha < 2.5°$. The upper limit value 2.5° of the angle α is set as a rolling angle at which the driving force transmitting efficiency is a predetermined value or more, and the lower limit value 0.7° of the angle α is set as a rolling angle generated following the deformation of a V-face due to an axial thrust on a drive or driven pulley.

2 Claims, 6 Drawing Sheets

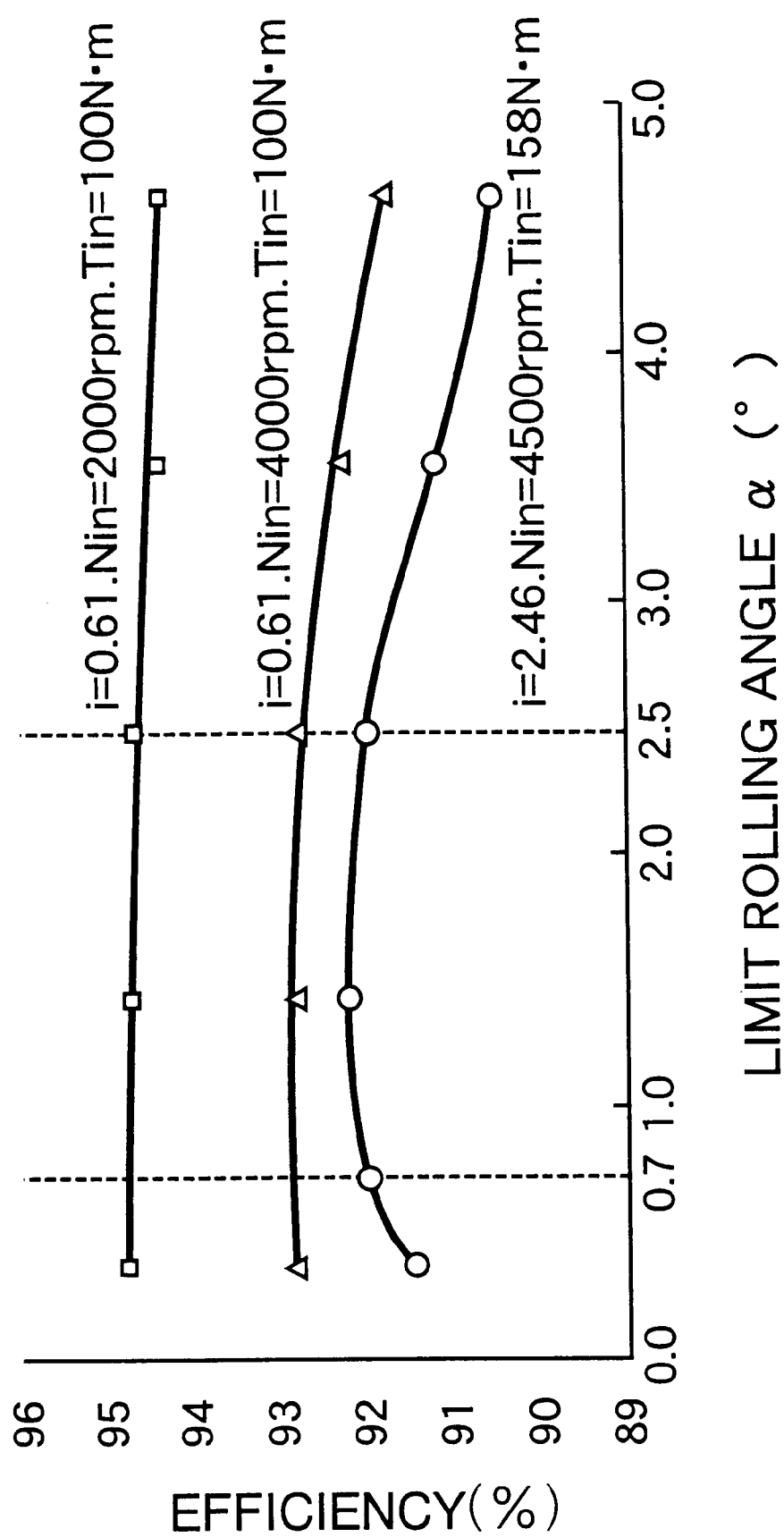

BELT FOR CONTINUOUSLY VARIABLE TRANSMISSION

BACKGROUND OF THE INVENTION

1. Field of the Invention

The present invention relates to a belt for a continuously variable transmission, which comprises a metal ring assembly comprising a plurality of endless metal rings laminated one on another, and a large number of metal elements each having a ring slot into which the metal ring assembly is fitted, the belt being wound around a drive pulley and a driven pulley, so that pulley-abutment faces of the metal elements abut against V-faces of the drive pulley and the driven pulley, thereby transmitting a driving force between both the pulleys.

2. Description of the Related Art

There is a metal belt for a continuously variable transmission which is known from Japanese Patent application Laid-open No.7-12177, and which is designed so that the excessive rolling of metal elements can be inhibited, whereby the metal elements can be smoothly meshed with pulleys, by setting $\tan^{-1} B/A$ at a value lower than $1°$, wherein A represents a distance between an outer end of one of left and right saddles faces of a metal element and an inner end of a lower face of an ear on the side opposite from the saddle face, and B represents a distance between a radially outer peripheral surface of a metal ring assembly and the lower face of the ear.

The groove width of a ring slot in the metal element is set slightly larger than the thickness of the metal ring assembly fitted in the ring slot. In the metal ring assembly supported at its radially inner peripheral surface on a saddle face of the ring slot, a small clearance is defined between the radially inner peripheral surface and the lower face of the ear. Therefore, a rolling of the metal elements relative to the metal ring assembly is permitted to an extent where the radially outer peripheral surface of the metal ring assembly is not brought into contact with the lower faces of the ear of the metal element. However, when the maximum rolling angle (which is defined herein as a limit rolling angle) of the metal elements within a range that the radially outer peripheral surface of the metal ring assembly does not interfere with the lower face of the ear is too large, namely, the clearance between the metal ring assembly and the lower face of the ear is large, and when the limit rolling angle is too small, there is a problem that the power transmitting efficiency of the metal belt decreases.

The present invention has been accomplished with the above circumstance in view, and it is an object of the present invention to ensure that the power transmitting efficiency of the metal belt is maintained at a high value and the durability of the metal ring assembly is enhanced by defining the range of the limit rolling angle of the metal elements.

To achieve the above object, according to a first feature of the present invention, there is provided a belt for a continuously variable transmission, which comprises a metal ring assembly formed of a plurality of endless metal rings laminated one on another, and a large number of metal elements each having a ring slot into which the metal ring assembly is fitted, the belt being wound around a drive pulley and a driven pulley in such a manner that pulley-abutment faces of the metal elements abut against V-faces of the drive pulley and the driven pulley for transmitting a driving force between both of the pulleys, wherein the relationship between the thickness of the metal ring assembly and the groove width of the ring slot is established so that a limit rolling angle $\alpha$ defined as a rolling angle of the metal elements provided when a radially outer peripheral surface of the metal ring assembly contacts a radially outer edge of the ring slot in the metal element is in a range of $0.7° < \alpha < 2.5°$.

According to a second feature of the present invention, the upper limit value of the limit rolling angle $\alpha$ of the metal elements is set as a value of a rolling angle at which the power transmitting efficiency of the belt is equal to or larger than a predetermined value.

According to a third feature of the present invention, the lower limit value of the limit rolling angle $\alpha$ of the metal elements is set as a value of a rolling angle generated following the deformation of the V-face due to an axial thrust on the drive pulley or the driven pulley.

With the above features, the relationship between the thickness of the metal ring assembly and the groove width of the ring slot is established so that the limit rolling angle $\alpha$ of the metal elements is smaller than $2.5°$. Therefore, it is possible to prevent the metal elements from being moved disorderly due to a large limit rolling angle $\alpha$ equal to or larger than $2.5°$ which causes a pinching between the metal elements and the V-faces of the pulley, thereby preventing a reduction in power transmitting efficiency. In addition, the relationship between the thickness of the metal ring assembly and the groove width of the ring slot is established so that the limit rolling angle $\alpha$ of the metal elements exceeds $0.7°$. Therefore, when the metal elements are forcibly rolled with the deformation of the V-faces due to the axial thrust on the pulley, such rolling can be prevented from being inhibited by the interference between the metal ring assembly and the lower faces of the ear with each other, thereby preventing the pinching between the metal elements and the V-faces of the pulley. Therefore, it is possible to prevent a decrease in power transmitting efficiency and a decrease in durability of the metal ring assembly.

BRIEF DESCRIPTION OF THE DRAWINGS

FIG. 6 is a graph showing the relationship between the limit rolling angle of the metal elements and the power transmitting efficiency.

DETAILED DESCRIPTION OF THE PREFERRED EMBODIMENT

The mode for carrying out the present invention will now be described by way of embodiment of the present invention shown in the accompanying drawings.

FIGS. 1 to 6 show an embodiment of the present invention.

Figure 1:
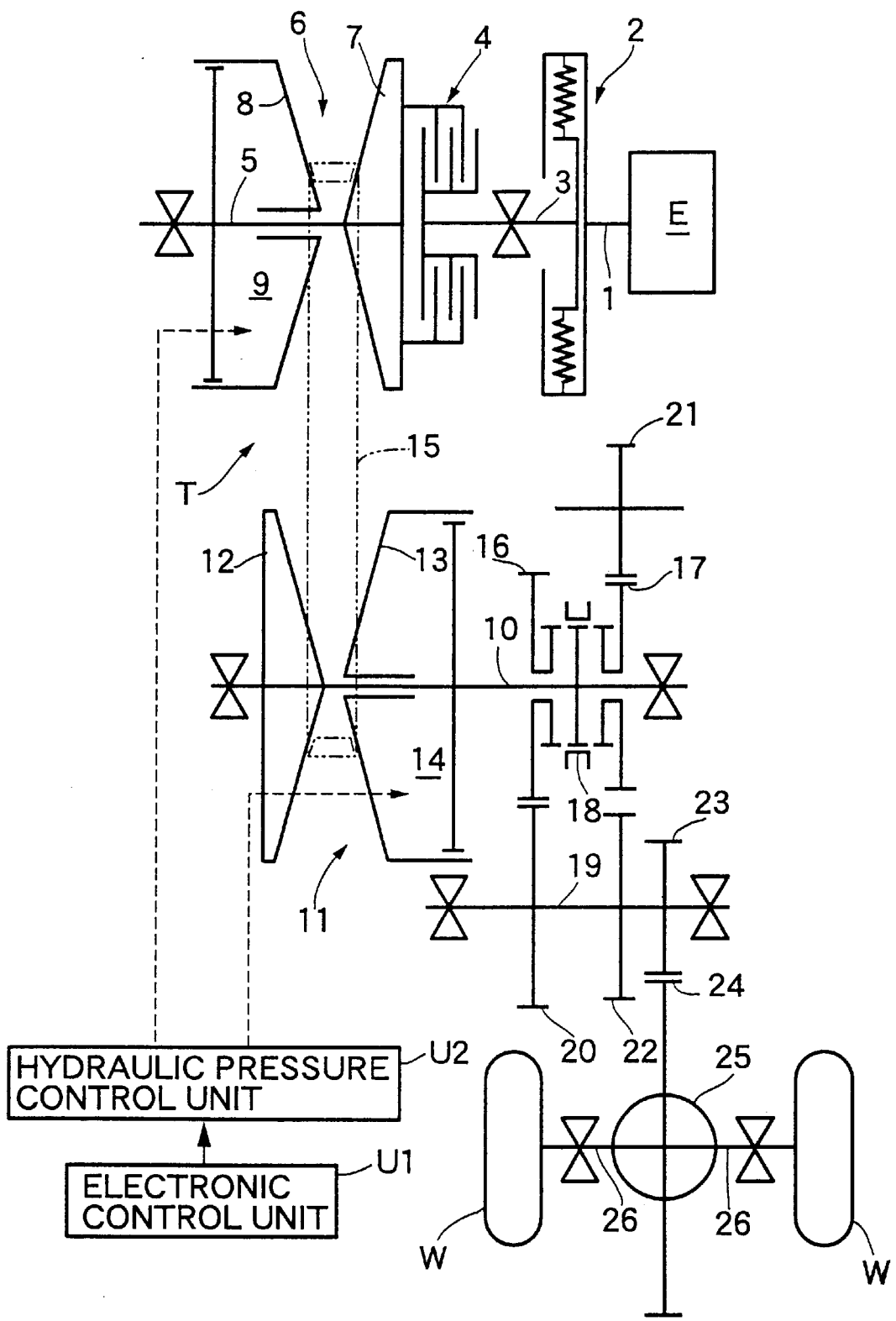
FIG. 1 is a skeleton illustration of a power transmitting system for a vehicle equipped with a continuously variable transmission.

FIG. 1 schematically shows the structure of a metal belt type continuously variable transmission T mounted on an automobile. An input shaft 3 connected to a crankshaft 1 of an engine E through a damper 2 is connected to a driving shaft 5 of the metal belt type continuously variable transmission T through a starting clutch 4. A drive pulley 6 provided on the driving shaft 5 comprises a stationary pulley half 7 secured to the driving shaft 5, and a movable pulley half 8 capable of moving toward and away from the stationary pulley half 7. The movable pulley half 8 is forced toward the stationary pulley half 7 by a hydraulic pressure applied to an oil chamber 9.

A driven pulley 11 is provided on a driven shaft 10 disposed in parallel to the driving shaft 5, and comprises a stationary pulley half 12 secured to the driven shaft 10, and a movable pulley half 13 capable of moving toward and away from the stationary pulley half 12. The movable pulley half 13 is forced toward the stationary pulley half 12 by a hydraulic pressure applied to an oil chamber 14. A metal belt 15 is wound around the drive pulley 6 and the driven pulley 11, and comprises a large number of metal elements 32 supported on a pair of left and right metal ring assemblies 31, 31 (see FIG. 2). Each of the metal ring assemblies 31, 31 comprises, for example, 12 metal rings 33 which are laminated on one another.

A forward drive gear 16 and a backward drive gear 17 are relatively rotatably supported on the driven shaft 10. The forward drive gear 16 and the backward drive gear 17 can be coupled selectively to the driven shaft 10 by a selector 18. A forward driven gear 20 meshed with the forward drive gear 16 and a backward driven gear 22 meshed with the backward drive gear 17 through a backward idling gear 21 are secured to an output shaft 19 which is disposed in parallel to the driven shaft 10.

The rotation of the output shaft 19 is input to a differential 25 through a final drive gear 23 and a final driven gear 24, and is transmitted therefrom through left and right axles 26, 26 to driven wheels W, W.

A driving force of the engine E is transmitted to the driven shaft 10 through the crankshaft 1, the damper 2, the input shaft 3, the start clutch 4, the drive shaft 5, the driven pulley 6, the metal belt 15 and the driven pulley 11. When a forward travel range is selected, the driving force of the driven shaft 10 is transmitted to the output shaft 19 through the forward drive gear 16 and the forward driven gear 20, thereby allowing the vehicle to travel forwards. When a backward travel range is selected, the driving force of the driven shaft 10 is transmitted to the output shaft 19 through the backward drive gear 17, the backward idling gear 21 and the backward driven gear 22, thereby allowing the vehicle to travel backwards.

In this metal belt type continuously variable transmission T, hydraulic pressures applied to the oil chamber 9 of the drive pulley 6 and the oil chamber 14 of the driven pulley 11 are controlled by a hydraulic pressure control unit U2 which is operated by a command from an electronic control unit U1, thereby continuously adjusting the change gear ratio. Specifically, if a hydraulic pressure applied to the oil chamber 14 of the driven pulley 11 is increased relative to a hydraulic pressure applied to the oil chamber 9 of the drive pulley 6, the grove width of the driven pulley 11 is reduced, leading to an increased effective radius, and correspondingly, the groove width of the drive pulley 6 is increased, leading to a reduced effective radius. Therefore, the change gear ratio of the metal belt type continuous variable transmission T is continuously varied toward "LOW". On the other hand, if the hydraulic pressure applied to the oil chamber 9 of the drive pulley 6 is increased relative to the hydraulic pressure applied to the oil chamber 14 of the driven pulley 11, the groove width of the drive pulley 6 is reduced, leading to an increased effective radius, and correspondingly, the groove width of the driven pulley 11 is increased, leading to a reduced effective radius. Therefore, the change gear ratio of the metal belt type continuous variable transmission T is continuously varied toward "TOP".

Figure 2:
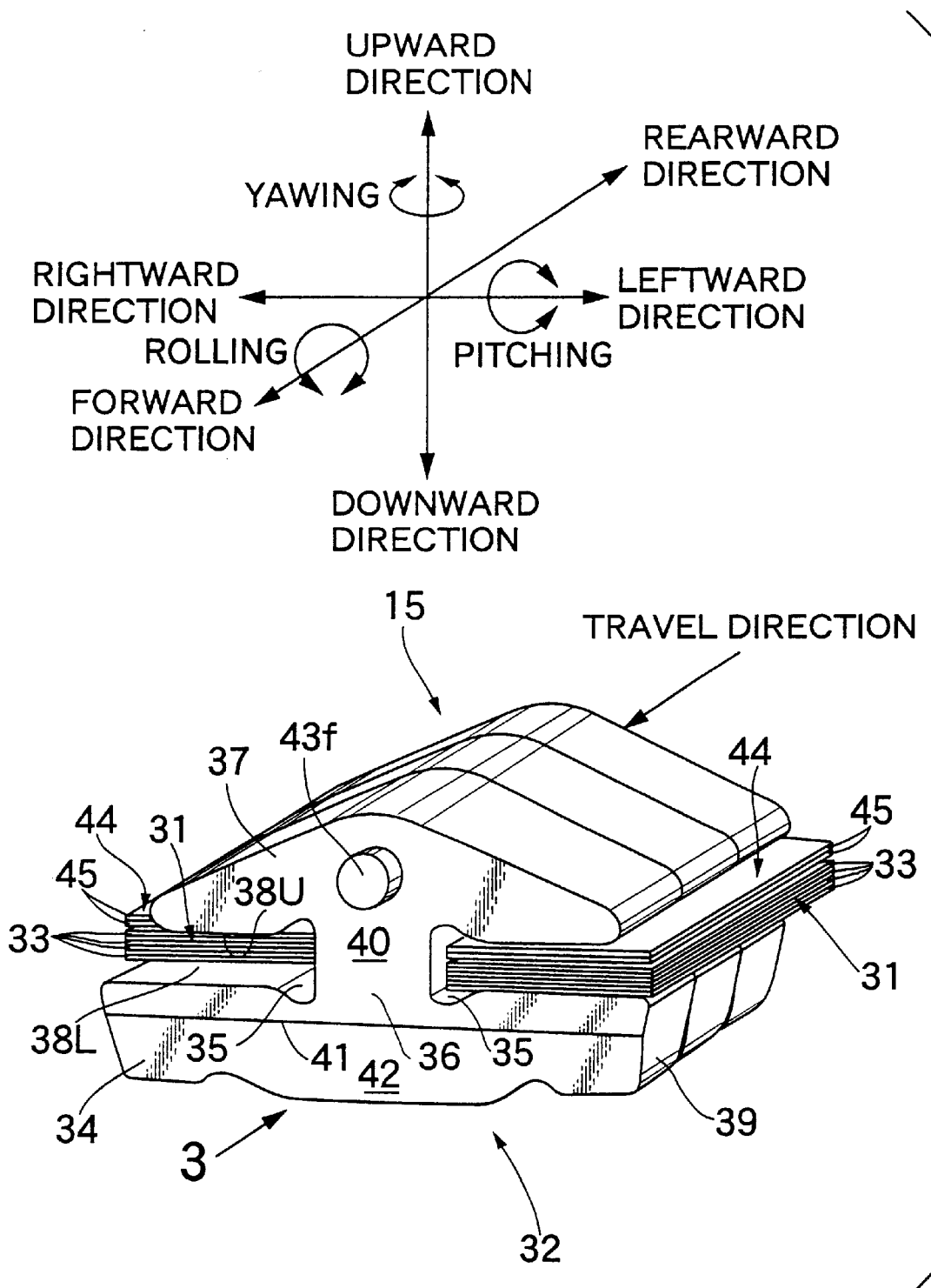
FIG. 2 is a partial perspective view of a metal belt.

As shown in FIG. 2, each of the metal elements 32 formed from a metal plate by punching, includes a substantially trapezoidal element body 34, a neck 36 located between a pair of left and right ring slots 35, 35 into which the metal ring assemblies 31, 31 are fitted, and a substantially triangular ear 37 connected to an upper portion of the element body 34 through the neck 36. The metal ring assemblies 31, 31 are sandwiched between saddle faces 38L, 38L constituting radially inner edges of the ring slots 35, 35 and lower faces 38U, 38U of the ear constituting radially outer edges of the ring slots 35, 35. The innermost metal rings 33, 33 of the metal ring assemblies 31, 31 are supported on the saddle faces 38L, 38L, and clearances are defined between the outermost metal rings 33, 33 of the metal ring assemblies 31, 31 and the lower faces 38U, 38U of the ear.

A pair of pulley-abutment faces 39, 39 capable of abutting against V-faces 44, 44 of the drive pulley 6 and the driven pulley 11 are formed at laterally opposite ends of the element body 34. A pair of front and rear main surfaces 40, 40 perpendicular to the travel direction and parallel to each other are formed on the front and rear portions of the metal element 32 in the travel direction. An inclined face 42 is formed below the front main surface 40 with a laterally extending locking edge 41 located therebetween. Further, a projection 43 and a recess (not shown) are formed on the front and rear surfaces of the ear 37 for connecting the metal elements 32, 32 adjacent in the forward and backward directions.

Figure 3:
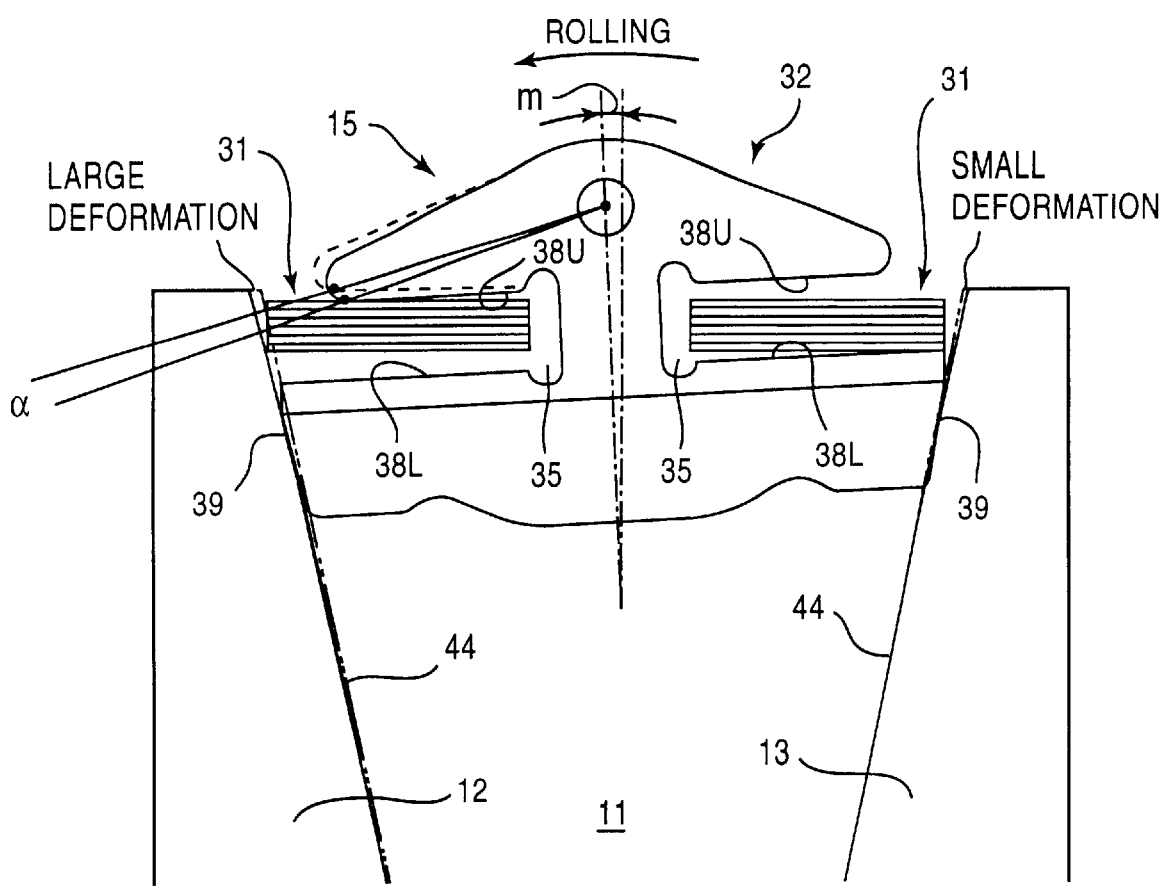
FIG. 3 is a diagram showing a metal element engaged with a driven pulley in a rolled state.
Figure 4:
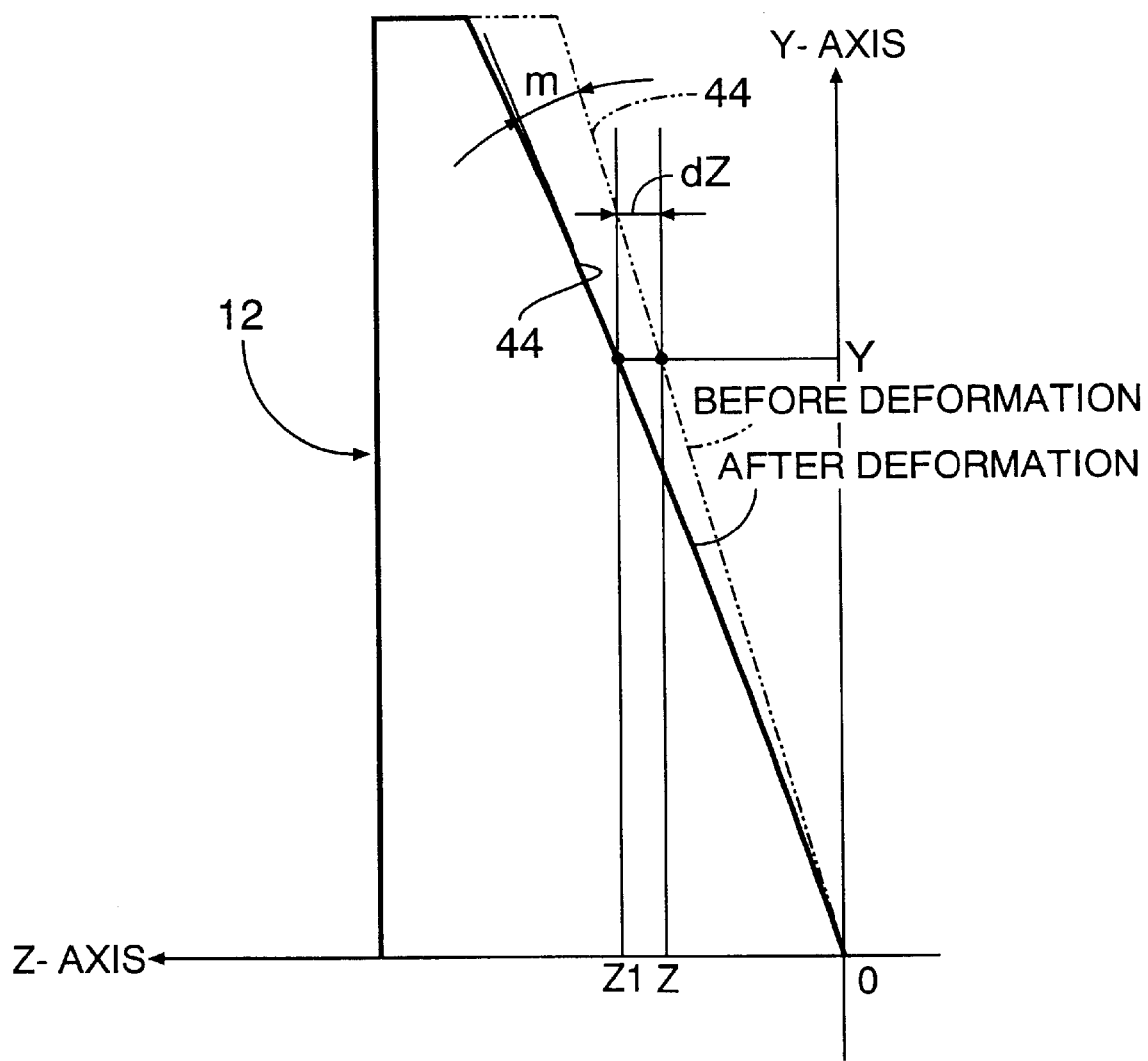
FIG. 4 is a diagram for explaining the deformation of a stationary pulley half of the driven pulley.

When the metal belt 15 is wound around the drive pulley 6 or the driven pulley 11, an axial thrust is applied to a region between the stationary pulley half 7 and the movable pulley half 8 of the drive pulley 6 or a region between the stationary pulley half 12 and the movable pulley half 13 of the driven pulley 11, to thereby prevent the V-faces 44, 44 of the pulleys 6 and 11 and the pulley-abutment faces 39, 39 of the metal elements 32 from slipping relative to each other. The amount of deformation of the metal element 32 compressed by the axial thrust is as very small as negligible, but the amount of deformation of the V-faces 44, 44 of the pulleys 6 and 11 is so large as to exert an influence to the behavior of the metal element 32. In the comparison of the amount of deformation of the stationary pulley halves 7 and 12 with the amount of deformation of the movable pulley halves 8 and 13, it has been experimentally made clear that the amount of deformation of the stationary pulley halves 7 and 12 is larger than the amount of deformation of the movable pulley halves 8 and 13. FIG. 3 shows the stationary pulley half 12 and the movable pulley half 13 of the driven pulley 11 in their deformed states. In FIG. 3, dashed lines shows states of the halves 12 and 13 before being deformed, and solid lines shows states of the halves 12 and 13 after being deformed.

TABLE 1

| Radial position (Y) | Axial position (Z) | Amount of axial deformation (dZ) | Axial position (Z1) | Amount of variation in angle of V-face (m) |
|---|---|---|---|---|
| 27.836 | 5.411 | 0.032 | 5.443 | 0.127 |
| 30.728 | 5.973 | 0.037 | 6.010 | 0.130 |
| 33.619 | 6.535 | 0.042 | 6.577 | 0.133 |
| 36.511 | 7.097 | 0.048 | 7.145 | 0.137 |
| 39.402 | 7.659 | 0.054 | 7.713 | 0.141 |
| 42.294 | 8.221 | 0.061 | 8.282 | 0.146 |
| 45.185 | 8.783 | 0.069 | 8.852 | 0.152 |
| 48.077 | 9.345 | 0.077 | 9.422 | 0.159 |
| 50.968 | 9.907 | 0.086 | 9.993 | 0.168 |
| 56.751 | 11.031 | 0.105 | 11.136 | 0.190 |
| 62.534 | 12.155 | 0.129 | 12.285 | 0.228 |
| 68.317 | 13.279 | 0.156 | 13.436 | 0.294 |
| 74.100 | 14.404 | 0.192 | 14.596 | 0.476 |
| 76.150 | 14.802 | 0.199 | 15.001 | 0.536 |
| 78.200 | 15.201 | 0.210 | 15.411 | 0.681 |

Table 1 shows the deformed states of the stationary pulley half 12 of the driven pulley 11 under operating conditions of a ratio i of 2.46 (LOW), an input rotational speed Nin of 4,500 rpm and an input torque Tin of 158 N·m. As apparent from Table 1 in reference with FIG. 4, the radial position Y in the first column in Table 1 is a radial distance measured from an axis of the pulley to a point on the V-face 44; the axial position Z in the second column is an axial distance measured from a top of the V-face 44 to a point (before deformation) on the V-face 44; the amount dZ of axial deformation in the third column is an amount of axial deformation measured at the point on the V-face 44; the axial position Z1 in the fourth column is a distance measured from the top of the V-face 44 to the point (after deformation) on the V-face 44; and the amount m of variation in angle of the V-face in the fifth column is a difference between the angles of the V-face before and after the deformation measured at a point on the V-face 44.

Figure 5:
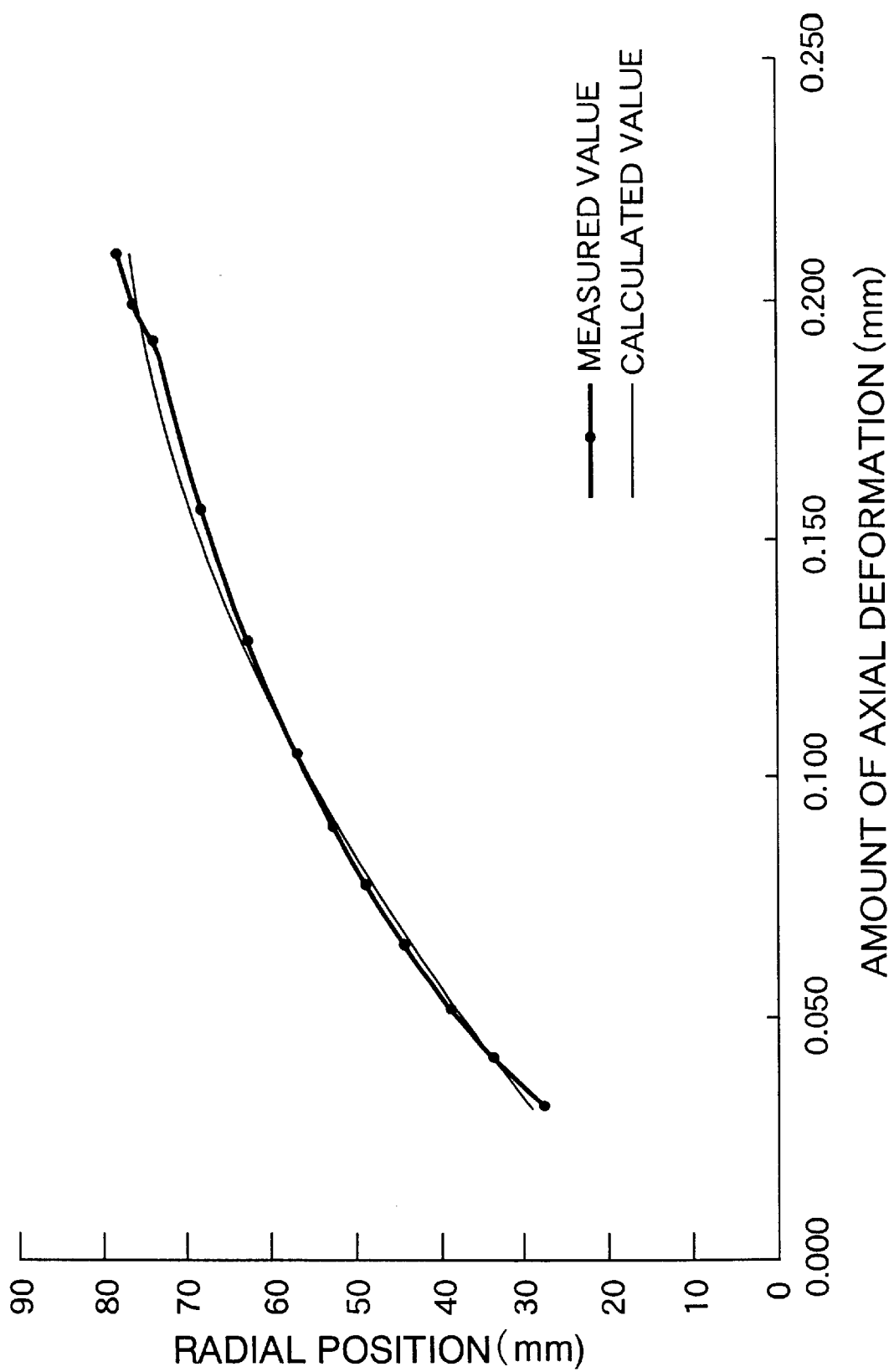
FIG. 5 is a graph showing the relationship between the radial position of the stationary pulley half of the driven pulley and the axial deformation amount of stationary pulley half.

As apparent from Table 1, the amount dZ of axial deformation of the V-face 44 is larger at a radially outer location. The amount m of variation in angle of the V-face is also larger at a radially outer location. The maximum value of the amount m of variation in angle of the V-face is 0.681°. Shown in FIG. 5 are calculated values and measured values of the amount dZ of axial deformation with respect to the radial position Y.

An angle formed by the pair of pulley-abutment faces 39, 39 of the metal element 32 is equal to an angle formed by the V-faces 44 of the driven pulley 11 in their undeformed states, but when the V-faces 44 are deformed as described above to produce an amount of variation in angle, it is impossible for both the pulley-abutment faces 39, 39 to abut against the V-faces 44, 44 simultaneously. In such a case, the following phenomenon is encountered: One of the pulley-abutment faces 39 of the metal element 32 is moved to follow the V-face 44 having an angle varied in a larger amount m, namely, the V-face 44 of the stationary pulley half 12, and the other pulley-abutment face 39 is moved away from the V-face 44 of the movable pulley half 13 having an angle varied in a smaller amount m. As a result, the metal elements 32 are rolled in such a manner that they are inclined toward the stationary pulley half 12, as shown in FIG. 3, and the rolling angle is equal to the amount m of variation in angle of the V-face of the stationary pulley half 12.

FIG. 6 shows variations in power transmitting efficiency of the metal belt 15 with respect to a limit rolling angle α of the element 32 in three operational states of the belt-type continuously variable transmission T. The power transmitting efficiency is maintained at a high level (92% or more), when the limit rolling angle α is in a range of 0.7°<α<2.5°, but is reduced when the limit rolling angle α is equal to or lower than 0.7° and equal to higher than 2.5°, as significantly shown in the case under the most severe operating conditions of a ratio i of 2.46 (LOW), an input rotational speed Nin of 4,500 rpm and an input torque Tin of 158 N·m.

The reason is considered to be as follows: As described above, the metal elements 32 are rolled at about 0.7° at the maximum due to the deformation of the stationary pulley half 12 of the driven pulley 11 and hence, if the limit rolling angle α is equal to or lower than 0.7°, the metal ring assembly 31 interferes with the lower face 38U of the ear upon only slight rolling of the metal elements 32, whereby the degree of freedom of the rolling of the metal elements 32 is reduced to cause a pinching between the metal elements 32 and the V faces 44, 44. When the limit rolling angle α is equal to or higher than 2.5°, the metal elements 32 can be rolled freely relative to the metal ring assembly 31 and hence, are moved disorderly to cause a pinching between the metal elements 32 and the V-faces 44, 44. Moreover, if the metal ring assembly 31 interferes with the lower face 38U of the ear because the limit rolling angle α is equal to or lower than 0.7°, there is a possibility that the metal rings 33 repeatedly receive a load from the lower face 38U of the ear, resulting in a reduction in durability.

If the limit rolling angle α of the metal elements 32 is set within the range of 0.7°<α<2.5° by suitably establishing the relationship between the groove width of the ring slots 44, 44 and the thickness of the metal ring assemblies 31, 31 according to the foregoing, it can be avoided that the degree of freedom of the rolling of the metal elements 32 is too small or too large, thereby maintaining the power transmitting efficiency at a higher level and preventing a reduction in durability of the metal ring assemblies 31, 31 due to the interference with the lower faces 38U, 38U of the ear.

As described above, according to the present invention, the relationship between the thickness of the metal ring assembly and the groove width of the ring slot is established so that the limit rolling angle α of the metal elements is smaller than 2.5°. Therefore, it is possible to prevent the metal elements from being moved disorderly due to a large limit rolling angle α equal to or larger than 2.5° which causes a pinching between the metal elements and the V-faces of the pulley, thereby preventing a reduction in power transmitting efficiency. In addition, the relationship between the thickness of the metal ring assembly and the groove width of the ring slot is established so that the limit rolling angle α of the metal elements exceeds 0.7°. Therefore, when the metal elements are forcibly rolled with the deformation of the V-faces due to the axial thrust on the pulley, such rolling can be prevented from being inhibited by the interference between the metal ring assembly and the lower faces of the ear, thereby preventing the pinching between the metal elements and the V-faces of the pulley. Therefore, it is possible to prevent a decrease in power transmitting efficiency and a decrease in durability of the metal ring assembly.

Although the embodiments of the present invention have been described in detail, it will be understood that the present invention is not limited to the above-described embodiments, and various modifications in design may be made without departing from the subject matter of the invention.

What is claimed is:

1. A belt for a continuously variable transmission, which comprises a metal ring assembly formed of a plurality of endless metal rings laminated one on another, and a large number of metal elements each having a ring slot into which said metal ring assembly is fitted, said belt being wound around a drive pulley and a driven pulley such that pulley-abutment faces of said metal elements but against V-faces of said drive pulley and said driven pulley for transmitting a driving force between both of the pulleys, wherein the relationship between the thickness of the metal ring assembly and the groove width of the ring slot is established so that a rolling angle of the metal elements provided when a radially outer peripheral surface of the metal ring assembly contacts a radially outer edge of the ring slot in the metal element is in a range of not more than a predetermined rolling angle $\alpha$ and so that a rolling angle of the metal elements generated by a deformation of said pulleys under a condition of low ratio and high load operation is within said range.

2. A belt for a continuously variable transmission according to claim 1, wherein an upper limit value of the range of said predetermined rolling angle $\alpha$ of the metal elements is set as a value of a rolling angle at which the power transmitting efficiency of the belt is equal to or large than a predetermined value.

* * * * *